(12) United States Patent  
Park

(10) Patent No.: US 11,087,715 B2
(45) Date of Patent: Aug. 10, 2021

(54) LIGHT TRANSMITTANCE ADJUSTABLE EYEWEAR

(71) Applicant: SPOCOM CO., LTD., Wonju-Si (KR)

(72) Inventor: Sooan Park, Seongnam-Si (KR)

(73) Assignee: SPOCOM CO., LTD., Wonju-si (KR)

( * ) Notice: Subject to any disclaimer, the term of this patent is extended or adjusted under 35 U.S.C. 154(b) by 0 days.

(21) Appl. No.: 16/756,040

(22) PCT Filed: Oct. 27, 2018

(86) PCT No.: PCT/KR2018/012873
§ 371 (c)(1),
(2) Date: Apr. 14, 2020

(87) PCT Pub. No.: WO2019/216505
PCT Pub. Date: Nov. 14, 2019

(65) Prior Publication Data
US 2020/0251070 A1    Aug. 6, 2020

(30) Foreign Application Priority Data
May 6, 2018  (KR) .................. 10-2018-0052196

(51) Int. Cl.
*G09G 5/00* (2006.01)
*G09G 5/10* (2006.01)
(Continued)

(52) U.S. Cl.
CPC .......... *G09G 5/10* (2013.01); *G02F 1/13318* (2013.01); *G09G 3/36* (2013.01); *G09G 2360/144* (2013.01)

(58) Field of Classification Search
CPC .... G02F 1/13318; G02F 1/503; G02F 1/1506; G02F 1/161; G02F 1/1347; G02F 1/1334;
(Continued)

(56) References Cited

U.S. PATENT DOCUMENTS

| 6,144,359 A * | 11/2000 | Grave ............... G02F 1/133605 345/102 |
| 2013/0048836 A1* | 2/2013 | Burt ...................... G02C 7/101 250/2 UAL |

(Continued)

FOREIGN PATENT DOCUMENTS

| JP | 2013122519 | 6/2013 |
| JP | 2016122039 A | 7/2016 |

(Continued)

OTHER PUBLICATIONS

International Search Report and Written Opinion for PCT Application No. PCT/KR2018/0128 73 dated Apr. 4, 2019, 13 pages.

(Continued)

*Primary Examiner* — Jennifer T Nguyen
(74) *Attorney, Agent, or Firm* — Dinsmore & Shohl LLP

(57) ABSTRACT

Provided is a light transmittance adjustable eyewear. The light transmittance adjustable eyewear includes a lens unit including a Liquid Crystal Display (LCD) panel of which a light transmittance is changed, an illuminance sensor configured to sense an ambient illuminance, and a controller configured to receive an ambient illuminance from the illuminance sensor, increase a light transmittance of the LCD panel in response to the ambient illuminance being equal to or less than a first threshold, and decrease the light transmittance of the LCD panel in response to the ambient illuminance being equal to or greater than the second threshold that is greater than the first threshold.

15 Claims, 7 Drawing Sheets

(51) Int. Cl.
*G02F 1/133* (2006.01)
*G09G 3/36* (2006.01)

(58) Field of Classification Search
CPC ...... G02F 1/155; G02B 27/0172; G09G 3/36;
G09G 3/2203; G09G 2360/144; G02C
7/083; G02C 11/01
USPC ...................................................... 345/207, 8
See application file for complete search history.

(56) References Cited

U.S. PATENT DOCUMENTS

| | | | |
|---|---|---|---|
| 2016/0187652 A1* | 6/2016 | Fujimaki ............ | G02B 27/0172 345/8 |
| 2017/0068112 A1 | 3/2017 | Bhatta | |
| 2017/0345391 A1* | 11/2017 | Usui ................... | G02B 27/017 |
| 2018/0322845 A1* | 11/2018 | Machida ............. | G02B 27/017 |
| 2019/0025692 A1* | 1/2019 | Yamashita ........... | G03B 21/56 |
| 2020/0133025 A1* | 4/2020 | Muramatsu ......... | G02C 7/101 |

FOREIGN PATENT DOCUMENTS

| | | |
|---|---|---|
| KR | 10-2012-0041923 A | 5/2012 |
| KR | 20140088028 A | 7/2014 |
| KR | 10-2015-0010229 A | 1/2015 |
| KR | 10-2015-0057754 A | 5/2015 |
| KR | 10-2017-0045443 | 4/2017 |
| KR | 20170056977 A | 5/2017 |
| KR | 10-1783800 B1 | 10/2017 |
| KR | 20180040143 A | 4/2018 |
| WO | 2016110959 A1 | 7/2016 |

OTHER PUBLICATIONS

European Search Report Application No. 18918041.7 dated Apr. 16, 2021, 8 pages.
Japanese Office Action for Application No. 2020-517325, 12 pages.

* cited by examiner

LIGHT TRANSMITTANCE ADJUSTABLE EYEWEAR

RELATED APPLICATIONS

The present application is a national phase application under 35 U.S.C. § 371 of International Application No. PCT/KR2018/012873, filed Oct. 27, 2018, which claims priority to Korean Application No. 10-2018-0052196, filed May 6, 2018, all of which are hereby incorporated in their entirety by reference as set forth herein.

TECHNICAL FIELD

The present disclosure relates to a light transmittance adjustable eyewear capable of effectively adjusting a light transmittance in response to a change in ambient illumination around a user.

TECHNICAL BACKGROUND

Eyewear is made of a transparent material, and some glasses are provided with a refractive index adjusted, but there are products that decreases the transmittance to protect the user's eyes from glare or ultraviolet rays. Sunglasses, which are generally used, are prepared by putting a colorant or the like on a transparent spectacle material or coating or depositing a material that reflects light, thereby making the user feel less glare or protecting the user's eyes from ultraviolet rays.

However, there are cases where the aforementioned products have a fixed light transmittance and may not be appropriately used according to the user's environment. For example, when an eyewear is fixed in a relatively high transmission state, it is suitable for use in a dark place or a low quantity of light, but in a bright place, the light transmittance is excessively high, so that an anti-glare effect or an ultraviolet ray blocking effect may be low. When an eyewear is fixed in a relatively low transmission state, the effect thereof is sufficiently exhibited in a bright place, but, if the transmittance is too low in a relatively dark place, there is a problem that the eyewear can not be used because surrounding objects are not properly seen.

In order to solve these problems, research on eyewear that can effectively adjust the light transmittance is required.

SUMMARY

An object of the present disclosure is to provide a light transmittance adjustable eyewear excellent in convenience, by improving the user's visibility by effectively adjusting the light transmittance according to a quantity of light of the surrounding environment used by the user.

In addition, another object of the present disclosure is to provide a light transmittance adjustable eyewear that can quickly adjust a light transmittance even in response to a sudden change in ambient illumination around a user to increase the visibility of the user, thereby increasing convenience.

In addition, another object of the present disclosure is to provide a light transmittance adjustable eyewear capable of stably adjusting a light transmittance in response to a change in ambient illumination.

Technical objects of the present disclosure are not limited to the above-described objects and other technical objects that have not been described above may become evident to those skilled in the art from the following description.

According to one aspect of the present disclosure, there is provided a light transmittance adjustable eyewear including a lens unit including a Liquid Crystal Display (LCD) panel of which a light transmittance is changed, an illuminance sensor configured to sense an ambient illuminance, and a controller configured to receive an ambient illuminance from the illuminance sensor, increase a light transmittance of the LCD panel in response to the ambient illuminance being equal to or less than a first threshold, and decrease the light transmittance of the LCD panel in response to the ambient illuminance being equal to or greater than the second threshold that is greater than the first threshold.

In addition, the LCD panel may have a light transmission range of 1% to 90%.

In addition, the light transmittance adjustable eyewear may further comprise a power supply configured to supply power to the LCD panel, wherein, when an ambient illuminance is equal to or less than the first threshold, the power supply increases the light transmittance of the LCD panel by supplying power to the LCD panel according to a control signal transmitted from the controller, and wherein, when an ambient illuminance is equal to or greater than the second threshold, the light transmittance of the LCD panel decreases the light transmittance of the LCD panel by cutting off power to the LCD panel according to a control signal transmitted from the controller.

In addition, the LCD panel may have a light transmittance of a first value in a state where no power is applied, and the LCD panel may have a light transmittance of a second value greater than the first value in a state where power is applied.

In addition, the light transmittance adjustable eyewear may further comprise a photo interrupter configured to control the power supply to be manually turned on/off.

In addition, the light transmittance adjustable eyewear may further comprise a power supply configured to supply power to the LCD panel, wherein, when the power supply supplies power to the LCD panel, the LCD panel is controlled to have a light transmittance of a first value, and when the power is cut off to the LCD panel, the LCD panel is controlled to have a second light transmittance greater than the first value.

In addition, the light transmittance adjustable eyewear may further comprise a photo interrupter configured to control supplying of power to the LCD panel to be manually turned on/off.

In addition, the light transmittance adjustable eyewear may further comprise a mode switch configured to switch to an off mode, an on mode, and a manual mode, wherein the light transmittance of the LCD panel is fixed in the off mode, the light transmittance of the LCD panel is adjusted by the controller in the on mode, and the light transmittance of the LCD panel is adjusted by the photo interrupter in the manual mode.

In addition, when a previous ambient illuminance exceeds the first threshold and a current ambient illuminance is changed to be equal to or less than the first threshold, the controller may increase the light transmittance of the LCD panel, and wherein, when a previous ambient illuminance is less than the second threshold and a current ambient illuminance is changed to be equal to or greater than the second threshold, the controller may increase the light transmittance of the LCD panel.

In addition, when a previous ambient illuminance and a current ambient illuminance are greater than the first threshold or less than the second threshold, the controller may adjust the light transmittance of the LCD panel after determining a difference between the previous ambient illuminance and the current ambient illuminance.

In addition, when a previous ambient illuminance and a current ambient illuminance are greater than the first threshold or less than the second threshold, the controller may adjust the light transmittance of the LCD panel so that a light transmittance range of the LCD panel is from 1% to 90%.

In addition, when a previous ambient illuminance and a current ambient illuminance are greater than the first threshold or less than the second threshold, the controller may adjust the light transmittance of the LCD panel so that an illuminance of light having passed through the LCD panel becomes a first illuminance.

In addition, the controller may adjust the light transmittance by inputting a correction value to an amount of change in illumination from a previous ambient illuminance to a current ambient illuminance, so that an illuminance of light having passed through the LCD panel becomes the first illuminance.

In addition, at least one of the first threshold and the second threshold may be changeable.

In addition, at least one of the first threshold and the second threshold may be manually changeable.

In addition, the ambient light sensor may sense and sample an ambient illuminance at least three times or more, and the controller may sense a rate of change of sampled ambient illuminances, and wherein at least one of the first threshold and the second threshold may be changed based on the rate of change in the ambient illuminances.

In addition, the ambient light sensor may sense and sample an ambient illuminance at least three times or more, and the controller may transmit a control signal to the LCD panel based on an average value of ambient illuminances sampled three times or more.

In addition, the ambient light sensor may sense and sample an ambient illuminance at least three times or more, and the controller may remove an ambient illuminance having a greatest difference from other ambient ambiences in ambient illuminances sampled three times or more.

According to another embodiment of the present disclosure, there is provided a light transmittance adjustable eyewear, including a lens unit including a Liquid Crystal Display (LCD) panel of which a light transmittance is changed, an illuminance sensor configured to sense an ambient illuminance, a mode switch configured to switch to an off mode, an on mode, and a manual mode, a controller configured to adjust a light transmittance of the LCD panel, and a photo interrupter configured to manually change the light transmittance of the LCD panel. When the mode switch is in the off mode, the light transmittance of the LCD panel is fixed, and when the mode switch is in the on mode, the controller receives an ambient illuminance from the illuminance sensor, and increases the light transmittance of the LCD panel in response to the ambient illuminance being equal to or less than a first threshold and decreases the light transmittance of the LCD panel in response to the ambient illuminance being equal to or greater than a second threshold greater than the first threshold. When the mode switch is in the manual mode, in response to a user touching the photo interrupter once, the controller controls the light transmittance of the LCD panel to have a light transmittance of a first value, and, in response to the user touching the photo interrupter once again, the controller controls the light transmittance of the LCD panel to have a light transmittance of a second value different from the first value.

Specific details of other embodiments are included in the detailed description and the drawings.

According to embodiments of the present disclosure, there are at least the following effects.

The light transmittance adjustable eyewear according to the present disclosure may adjust the light transmittance to increase the user's visibility and increase convenience in a dark day or a night or a bright day or a day when the quantity of light is high.

In addition, even if the illuminance around the user changes abruptly, by changing the light transmittance quickly, it is possible to increase the visibility and convenience of the user.

In addition, the light transmittance may be adjusted more stably in response to a change in ambient illumination.

The effects according to the present disclosure are not limited by the contents exemplified above, and more various effects are included in the present specification.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
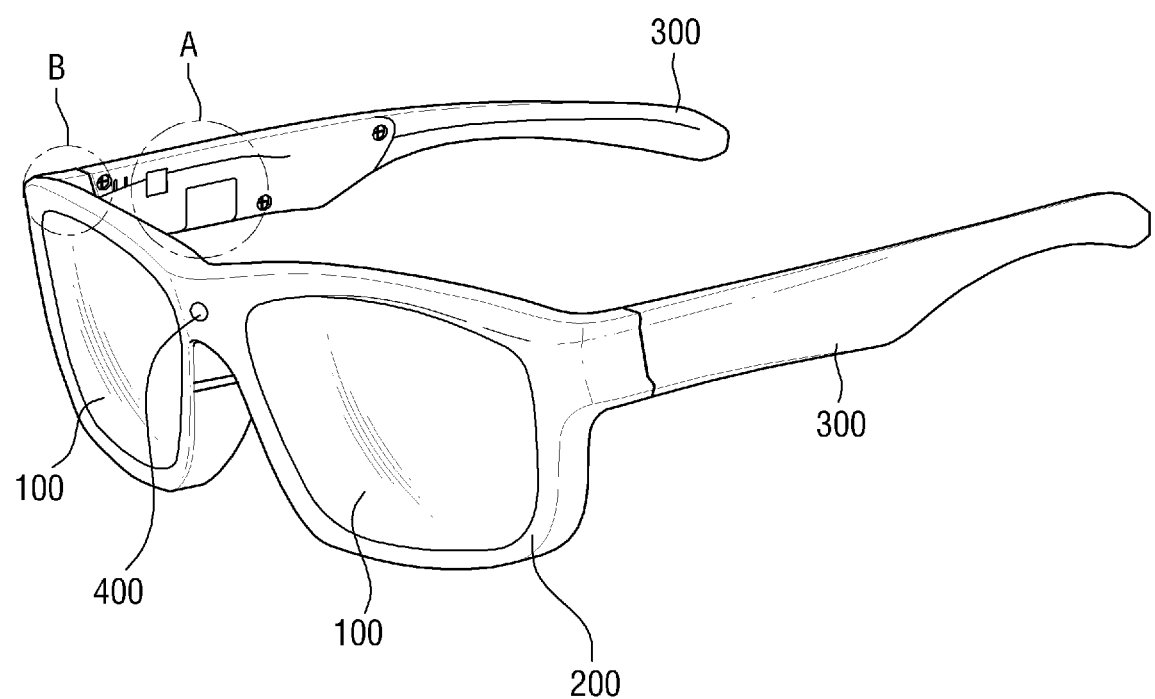
FIG. 1 is a schematic perspective view of a light transmittance adjustable eyewear according to an embodiment of the present disclosure.

The features and advantages of the present disclosure and the method to achieve them will become more apparent from the following detailed description in conjunction with the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present disclosure will only be defined by the appended claims. Like reference numerals refer to like elements throughout the specification. In the drawings, sizes and relative sizes of layers and regions may be exaggerated for clarity.

Spatially relative terms, such as "beneath," "below," "lower," "above," "upper" and the like, may be used herein for ease of description to describe one element or feature's relationship to another element(s) or feature(s) as illustrated in the figures.

In this specification, although the terms first, second, etc. may be used to describe various elements, it should be understood that these elements are not limited by these terms. These terms are only used to distinguish one element from another. Therefore, a first element could be termed as a second element without departing from the scope of exemplary embodiments of the present disclosure.

In addition, an eyewear of the present disclosure described below refers to products having a lens to be worn on the eyes, such as ski goggles, sports glasses, smart glasses, sunglasses, safety glasses. In the description of this specification, illumination, light, and a quantity of light may be described as being interchangeably with each other.

Hereinafter, embodiments of the present disclosure will be described with reference to the drawings.

Figure 2:
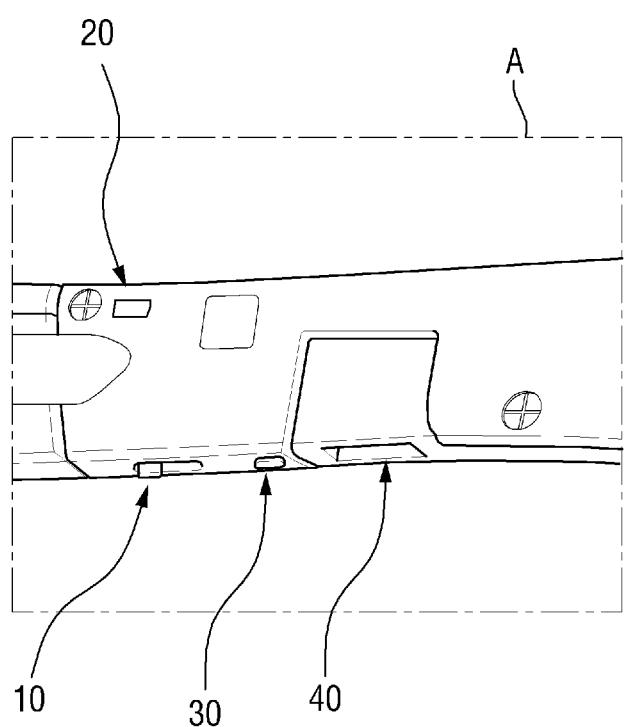
FIG. 2 is an enlarged view of a portion A of the light transmittance adjustable eyewear of FIG. 1.
Figure 3:
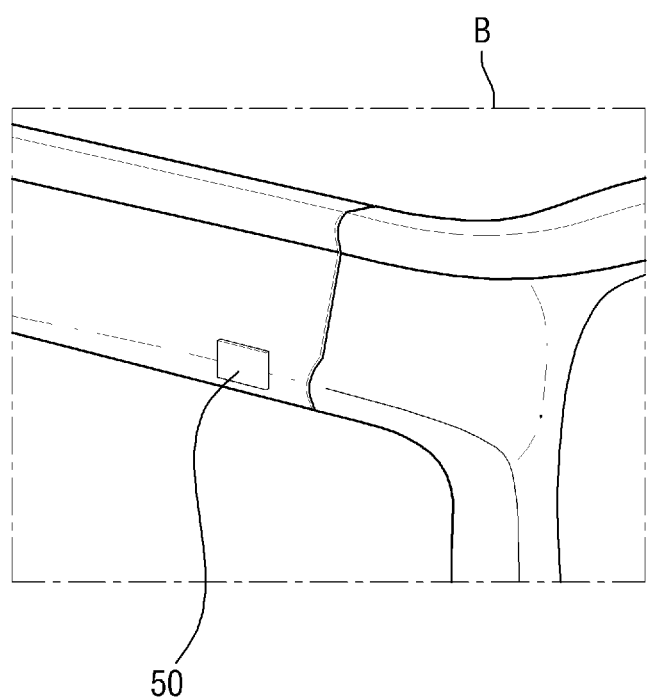
FIG. 3 is an enlarged view of a portion B of the light transmittance adjustable eyewear of FIG. 1.

FIG. 1 is a schematic perspective view of a light transmittance adjustable eyewear according to an embodiment of the present disclosure, FIG. 2 is an enlarged view of a portion A of the light transmittance adjustable eyewear of FIG. 1, and FIG. 3 is an enlarged view of a portion B of the light transmittance adjustable eyewear of FIG. 1.

Figure 4:
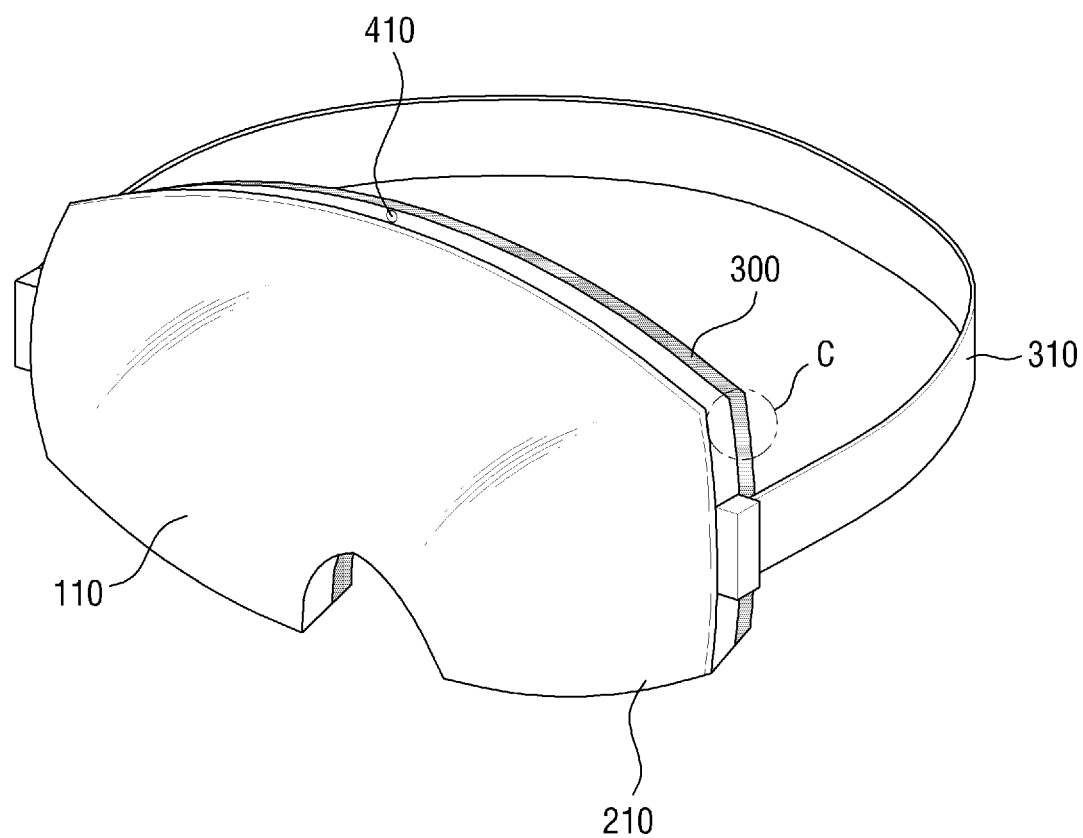
FIG. 4 is a schematic perspective view of a light transmittance adjustable eyewear according to another embodiment of the present disclosure.
Figure 5:
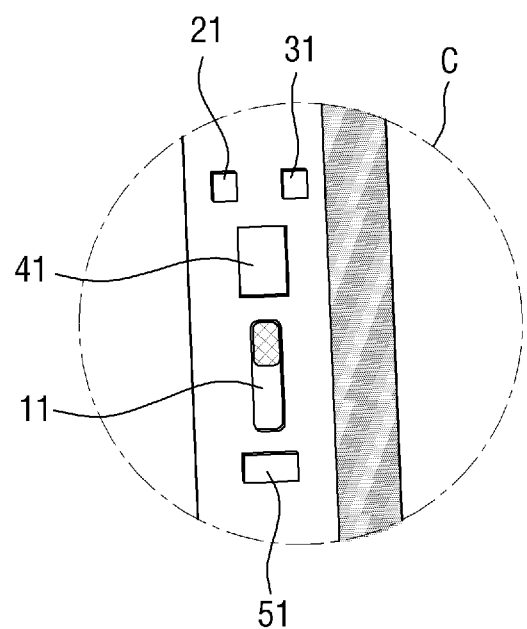
FIG. 5 is an enlarged view of a portion C of the light transmittance adjustable eyewear of FIG. 4.

In addition, FIG. 4 is a schematic perspective view of a light transmittance adjustable eyewear according to another embodiment of the present disclosure, and FIG. 5 is an enlarged view of a portion C of the light transmittance adjustable eyewear of FIG. 4.

The light transmittance adjustable eyewear of FIGS. 1 to 3 may be understood as sports glasses, sunglasses, and the like, which are worn on ears using an eyeglass frame 200, and the light transmittance adjustable eyewear of FIGS. 4 and 5 may be an example of a product such as ski goggles.

Referring to FIGS. 1 to 5, a light transmittance adjustable eyewear includes a lens unit 100 and 110 including a liquid crystal display (LCD) panel in which a light transmittance is changed, illuminance sensor 20 and 21 for sensing an ambient illuminance, and a controller (not shown) for receiving an ambient illuminance from the illuminance sensor 20 and 21, increasing the light transmittance of the LCD panel in response to the ambient illuminance is equal to or less than a first threshold and decreasing the light transmittance of the LCD panel in response to the ambient illuminance is equal to or greater than a second threshold greater than the first threshold.

The LCD panel of the lens unit 100 and 110 is a non-limiting example and may be implemented by an Electro Chromic (EC) method, a Guest-Host (GH) method, a Twist Nematic (TN) method, an electronic ink method, or a Polymer Dispersed Liquid Crystal (PDLC) method. The LCD panel may appropriately adjust a quantity of light transmitted to the user's eye by adjusting the light transmittance in response to illumination of the user's surrounding environment or a change in the illumination of the surrounding environment. Meanwhile, the term "appropriately" may refer to a meaning that the quantity of light transmitted to the user is reduced to prevent glare when ambient illuminance is high as the quantity of light is relatively high, and the transmittance is increased relatively highly when the ambient light is relatively low, such as at night or in a tunnel.

A light transmittance of the LCD panel may be adjusted by changing the shape of liquid crystals included in the LCD panel, thereby adjusting the quantity of light transmitted, thereby changing the light transmittance. The LCD panel may have retardation film as needed. The polarizer film may be a form in which a protective film is attached to one side or both sides of a polarizer in which iodine or a dichroic dye is dyed and oriented in a Poly Vinyl Alcohol Film improved Waterproof, and this is well-known in the field to which the present disclosure pertains, and therefore, a detailed description thereof will be omitted. In the case of the LCD panel, there is an advantage that a light transmittance may be changed quickly according to an applied electrical signal.

The light transmittance of the LCD panel may be adjusted in a range of 1% to 90%. For example, the light transmittance of the LCD panel may be 1% to 30%, 10% to 50%, or 30% to 75%. The quantity of light that has passed through the LCD panel by the LCD panel may be adjusted in the transmittance range to be delivered to the eye of the user. For example, if the ambient illuminance is 1000 LUX and the light transmittance of the LCD panel is 10%, the quantity of light reaching the user's eye is 100 LUX, and if the ambient illuminance is 200 LUX and the light transmittance of the LCD panel is 50%, the quantity of light of 100 LUX may be delivered to the eyes of the user. As will be described in more detail below, the LCD panel may adjust the light transmittance by receiving a control signal from the controller, and, in case where a separate power supply described later is included, the power supply may be turned on/off by a control signal transmitted from the controller, the light transmittance of the LCD panel may be adjusted by the power supply, or the light transmittance may be adjusted in a manual mode by a separate photo interrupter.

Meanwhile, the LCD panel may vary the light transmittance range depending on a purpose of use. For example, in the case of commonly used sunglasses, the light transmittance range may be adjusted high so that a relatively high quantity of light is transmitted to the user's eye to increase visibility. In addition, in the case of ski goggles which are mainly used in a place where a lot of light is reflected by a lot of snow, the light transmittance range may be decreased to be relatively lower as compared with general sunglasses, and thus, visibility may be improved while preventing glare. Meanwhile, in the case of welding eyewear, the quantity of light introduced instantaneously is very large, and thus the light transmittance range may be adjusted very low to about 1%. However, even in the case of the welding eyewear, when the welding is not performed, the light transmittance may be increased to increase visibility, and in this case, the changing light transmittance range of the LCD panel may be set wide. In other words, the light transmittance variation range of the LCD panel may be differently set in consideration of various factors such as a use purpose, an environment for use, a user's taste, and an environmental factor around the user.

The illuminance sensors 20 and 21 senses an illuminance around the light transmittance adjustable eyewear and transmits the sensed ambient illuminance to the controller. When the light transmittance adjustable eyewear is glasses or sunglass, the illuminance sensor 20 and 21 may be disposed on the eyeglass frame 200 or a temple 300, but not limited thereto. In addition, when the light transmittance adjustable eyewear is a goggle, the illuminance sensor 20 and 21 may be disposed on the front or side of the lens frame 210. However, in a preferred example, in order to more accurately detect the illuminance of the surrounding environment of the user, the illuminance sensor 20 or 21 may be disposed inside the spectacle frame, the glasses leg, or the lens frame. The term "Inside" refers to a position closer to the face of the user in the components of the eyewear. For example, when the illuminance sensor 20 and 21 is disposed on the temple 300, it may be disposed in a position adjacent to the crown between the eye and the ear of the user at the position where the temple 300 is seated. In other words, the temple 300 may be disposed on side surfaces of the temple 300 that face each other.

However, the present disclosure is not limited thereto, and the illuminance sensor 20 or 21 may be located at the front part of the eyeglass frame 200 or the front of the lens frame 210 according to the use purpose. That is, the illuminance sensor 20 and 21 may be disposed on the outside in a direction which the user's eye looks forward, and the light sensor 20 and 21 may be disposed on an optical path that the light is transmitted to the user's eye, so that an illuminance of the light delivered to the user's eye may be sensed more quickly. For example, in the case of the welding eyewear, it is necessary to detect the illuminance faster and change the light transmittance of the LCD panel so as to protect the user's eyes. In this case, the illuminance sensor 20 and 21 may be located near the light generated during welding, so that the light transmittance of the LCD panel may be changed more quickly.

The controller may receive the ambient illuminance sensed by the illuminance sensor 20 and 21, and if the ambient illuminance is less than a first threshold, the controller may increase the light transmittance of the LCD panel, and, if the ambient illuminance is equal to or greater than a second threshold that is greater than the first threshold, the controller may reduce the light transmittance of the LCD panel. The second threshold is greater than the first threshold and is related to the light transmittance adjustment when the ambient illuminance is relatively high, and the first threshold is related to the light transmittance adjustment when the ambient illuminance is relatively low. That is, when a received ambient illuminance is greater than the second threshold, the light transmittance of the LCD panel may be decreased, and when the received ambient illuminance is less than the first threshold, the light transmittance of the LCD panel may be increased. That is, the controller may generate and transmit a control signal to change the light transmittance of the LCD panel.

As described above, the light transmittance of the LCD panel may be adjusted by the controller to increase visibility of a surrounding object in a manner in which a high light transmittance is used when the ambient illuminance is equal to or less than the first threshold, and a low light transmittance is applied when the ambient illuminance is equal to or greater than the second threshold. In addition, it is possible to prevent glare and ensure that the surrounding object is visually recognized well.

Meanwhile, when the first and second thresholds and the light transmittance adjustment according to the present disclosure are described in detail, the first and second thresholds may be set to specific illuminance values. However, generating a control signal for adjusting the light transmittance based on the first threshold and the second threshold may be calculated by a value different from the illuminance value by inputting a separate correction value. When the ambient illuminance having a value equal to or greater than the second threshold is received, the controller may adjust the light transmittance of the LCD panel, thereby reducing the quantity of light transmitted to the user's eye.

For example, when a high quantity of light is introduced from the outside into the LCD panel at an illuminance greater than the second threshold, the user may feel glare or may not be able to see the surrounding object. Thus, by reducing the light transmittance of the LCD panel, it is possible to prevent the glare and ensure that the surrounding object is visually easily recognized. In addition, when a low quantity of light is introduced into the LCD panel from the outside with an illuminance less than the first threshold, if the light is transmitted to the user's eye with the same light transmittance as the light transmittance of the LCD panel in the case where the light transmittance is greater than the second threshold, It may be difficult to visually recognize an external object due to a small quantity of light. However, when the quantity of light with an illuminance less than the first threshold is introduced, it is possible to improve visibility by increasing the light transmittance of an LCD panel.

The first threshold and the second threshold may be preset values. As a non-limiting example, the second threshold may be a numerical value corresponding to an illuminance in the range of 1200 LUX to 1800 LUX, and the first threshold may be a numerical value corresponding to an illuminance in the range of 600 LUX to 1000 LUX. If the illuminance in a typical indoor space is about 500 LUX to 600 LUX and the illuminance of an outdoor space is 2000 LUX, the light transmittance of the LCD panel may exceed the second threshold in the indoor space and thus the light transmittance of the LCD may be adjusted in a way to reduce the light transmittance, and the illuminance less than the first threshold may be sensed and thus the light transmittance of the LCD panel may be be adjusted in a way to increase the light transmittance.

For example, suppose that the light transmittance of the LCD panel is changed in the range of 10% to 50%, that the first threshold is 600 LUX, that the second threshold is 1800 LUX, that the indoor ambient illuminance is 500 LUX, and that the outdoor ambient illuminance is 2000 LUX. In this case, since a quantity of light less than the first threshold is introduced in the indoor space, the light transmittance of the LCD panel may be changed to 50% and approximately 250 LUX of light may be transmitted to the user's eye. Since an quantity of light greater than the second threshold is introduced in the outdoor space, the light transmittance of the LCD panel may be changed to 10% and light of 200 LUX light may be transmitted to the user's eye, thereby reducing the difference in illuminance transmitted to the user's eye indoors and outdoors.

That is, even if the light transmittance of the LCD panel is high even when the quantity of light of 2000 LUX, which is the quantity of light exceeding the second threshold of 1800 LUX, is introduced, the user may feel uncomfortable due to glare or it may be difficult to visually recognize the object. In this case, by allowing the controller to detect the quantity of light exceeding the second threshold and by reducing the light transmittance of the LCD panel to 10%, it is possible to increase the visibility while preventing glare. In addition, even in the case where a quantity of light of 500 LUX, which is less than the first threshold of 600 LUX, is input, if the light transmittance is maintained to be low at 10%, the user may have difficulty in visually recognizing an object due to an insufficient illuminance of about 50 LUX. In this case, by allowing the controller to visually recognize a quantity of light less than the first threshold of 600 LUX and by increasing the light transmittance of the LCD panel to 50%, it is possible to allow the user to visually easily recognize an object.

However, as described above, the light transmittance of the LCD panel, and the numerical values of the first threshold and the second threshold may vary depending on factors such as a purpose of use of the eyewear, a surrounding environment of the user, and a type of use.

On the other hand, the light transmittance adjustable eyewear according to the present disclosure may further include a power supply for supplying power to the LCD panel. When an ambient illuminance is equal to or less than the first threshold, the power supply may supply power to the LCD panel in accordance with a control signal transmitted from the controller to increase the light transmittance of the LCD panel, and when an ambient illuminance is equal to or greater than the second threshold, the power supply may cut the power supplied to the LCD panel in accordance with the control signal transmitted from the controller to reduce the light transmittance of the LCD panel.

In the case where the light transmittance adjustable eyewear includes the power supply, the LCD panel may have a light transmittance of a first value in a state where power is not applied, and the LCD panel may have a light transmittance of a second value greater than the first value in a state where power is applied. In general, a user mainly wears an eyewear during a day time when the quantity of light is large or in an outdoor space. In such cases, the eyewear has the light transmittance of the first value, which is a relatively low light transmittance, in a state in which power is not received from the power supply. Hence, it is possible to reduce the quantity of light that reaches the user's eye by reducing the quantity of light flowing from the outside, thereby preventing unnecessary power consumption. That is, when no artificial operation is performed in an off mode or a manual mode, which will be described below, the basic setting of the LCD panel is set to the first value corresponding to a low light transmittance, thereby reducing unnecessary power consumption to reduce battery wear and increase battery lifetime. In addition, even in the on mode, in consideration of the purpose, use, and the like of wearing the eyewear, the basic setting may be set to the first value corresponding to a low light transmittance, thereby reducing unnecessary power consumption.

Meanwhile, the LCD panel applies power to the LCD panel through a power supply at night, indoors, tunnels, etc., where the quantity of light is relatively low, thereby adjusting the light transmittance to a second value greater than the first value. In doing so, the quantity of light reaching the eye may be increased to be relatively larger than the light transmittance of the first value. For example, when the quantity of light decreases rapidly as the user suddenly passes through a dark place such as a tunnel while driving, power may be applied to the LCD panel through the power supply and the light transmittance may be increased to the second value to increase visibility.

Meanwhile, when an operation method through the power supply is exemplarily described in more detail, a non-limiting example may be that the light transmittance of the first value of the LCD panel is 10% when power is not applied through the power supply and that the light transmittance of the second value of the LCD panel may be 50% when power is applied. In this case, while the user is driving in a bright day with a high quantity of light, the ambient illuminance sensed by the illuminance sensor 20 and 21 may be a value greater than or equal to the second threshold, and if a light transmittance is 10% of the first value in a state in which power supplied from the power supply to the LCD panel is cut, the quantity of light transmitted to the eye of the user may be reduced greatly relative to an initial quantity of light, thereby preventing glare and increasing visibility. On the other hand, in the case of entering a tunnel or the like while driving, the ambient illuminance is inevitably reduced. In this case, the ambient illuminance may be sensed to a value equal to or less than the first threshold, thereby supplying power from the power supply to the LCD panel by the controller and instantaneously increasing the light transmittance range of the LCD panel to 50%.

That is, even when the ambient illuminance is suddenly reduced, it is possible to prevent the problem that an external object is not visible suddenly, by supplying power through the power supply to rapidly increase the light transmittance. In other words, even when the user enters a tunnel or the like, if the light transmittance of the LCD panel is low as in the above-described state, a dangerous situation may occur because surrounding objects are not visually recognized. As such, if the sensed ambient illuminance is rapidly reduced, it is possible to solve the problem that the surrounding objects are not visible, by increasing the light transmittance of the LCD panel at a high speed.

Meanwhile, a photo interrupter 50 and 51 for manually turning on/off the power supply may be further included. The photo interrupter 50 and 51 may enable manually turning on/off supplying power to the LCD panel. The photo interrupter 50 and 51, which is a combination of a light emitting diode and a photo transistor, may block an optical path so that the power supply is manually turned on/off the power supply to adjust the light transmittance of the LCD panel. For example, when the user wears a light transmittance adjustable eyewear and blocks an optical path by using a hand at a portion adjacent to the photo interrupter 50 and 51, the user may turn on the power supply again. When the optical path is blocked by using the hand again, the power supply may be turned off to stop driving of the power supply. As a result, a load may not be applied to the light transmittance adjustable eyewear worn on the face of the user, and the power supply may be conveniently turned on and off without changing a state in which the eyewear is worn.

Meanwhile, as a non-limiting example, a power switch 30 and 31 for turning on/off a controller configured to control the light transmittance of the power supply or the LCD panel may be further included, and the power switch 30 and 31 may be disposed on the eyeglass frame 200 or the temple 300 when the light transmittance adjustable eyewear is glasses or sunglass. In addition, when the light transmittance adjustable eyewear is a goggle, the power switch 30 and 31 may be disposed on a side surface of the lens frame 210. As a non-limiting example, the power switch 30 and 31 may be a tack switch which is, for example, turned on when the switch is pressed once or turned off when the switch is pressed again and thus returned to the original state.

A battery part connected to the power supply to store and supply power may be further included, and the battery part may be disposed on the eyeglass frame 200 or the temple 300 when the eyewear is glasses or sunglasses or may be disposed on the lens frame 210 when the light transmittance adjustable eyewear is goggles. In addition, the battery part may include a charging unit 40 and 41 to receive and store power from the outside, and the charging unit 40 and 41 may be connected to a charging jack that extends from an external power source to receive power from the external power source. The charging unit 40 and 41 may be disposed at a lower end of the light transmittance adjustable eyewear on the basis of a user so that the charging unit 40 and 41 is not visible from the outside, and a cap for covering the charging unit 40 and 41 may be provided separately to protect the device from moisture or dust.

Meanwhile, the light transmittance adjustable eyewear according to the present disclosure may further include a separate mode switch 10 and 11 for setting an operation method of adjusting the light transmittance of the LCD panel. That is, the mode switch 10 and 11 may be included to adjust the on mode for automatically adjusting the light transmittance of the LCD panel in relation to an ambient illuminance measured by the illuminance sensor, the manual mode for allowing the user to directly adjust the light transmittance, or the off mode for preventing the LCD panel from operating. The mode switch 10 and 11 may be, for example, implemented in a sliding manner, so that the user may adjust the light transmittance in phases.

For example, when the mode switch 10 and 11 is in the on mode, the light transmittance of the LCD panel may be adjusted by the controller as described above. In addition, in the off mode, the light transmittance of the LCD panel may be fixed at a specific transmittance, and in this case, as described above, the light transmittance of the LCD panel may be relatively low as compared with the case where power is supplied to the LCD panel. In addition, in the manual mode, the light transmittance of the LCD panel may be manually adjusted by the photo interrupter 50 and 51. For example, when the user selects the photo interrupter 50 and 51 once while the mode switch is in the manual mode, the controller may cause the light transmittance of the LCD panel to be a light transmittance of a first value, and when the user touches the photo interrupter 50 and 51 one more time, the controller may cause the light transmittance of the LCD panel to be a light transmittance of a second value different from the first value.

Meanwhile, at least one of the first threshold and the second threshold may be changed. In addition, at least one of the first threshold and the second threshold may be manually changed. That is, the first threshold and the second threshold may be changed by the user according to the user's taste, the user's surrounding environment, or the user's pattern of use.

For example, when a user is mainly active in a dark environment or at night, the first threshold may be increased to relatively increase the quantity of light transmitted to the eye of the user. That is, for example, suppose that the first threshold is set to 200 LUX or 400 LUX. In order to increase the light transmittance when the first threshold is 200 LUX, the light transmittance is increased only when the ambient illuminance is equal to or less than 200 LUX. In the case of an environment in which there is a relatively less quantity of light, if the first threshold is increased to 400 LUX, the light transmittance may be increased even when ambient illuminance is, for example, 300 LUX or 350 LUX, and accordingly, the light transmittance may be increased according to a user environment.

On the contrary, when a user is mainly active in a bright environment or daytime, the second threshold may be decreased to reduce the quantity of light transmitted to the eye of the user relatively, thereby preventing the glare. For example, suppose that the second threshold is set to 700 LUX and 900 LUX. When the second threshold is 900 LUX, the quantity of light transmitted to the user's eye may be reduced only in the case where an ambient luminance is equal to or greater than 900 LUX, so that the light transmittance of the LCD panel may be reduced to prevent glare and increase visibility. When the second threshold is set to 700 LUX, the light transmittance of the LCD panel may be reduced even though an ambient illuminance is between 700 LUX and 900 LUX, thereby reducing the quantity of light transmitted to the eye of the user.

The change of the first threshold and/or the second threshold may be adjusted by the user in phases by a predetermined operation unit (not shown). For example, when a threshold is divided into three stages, it is possible to change the threshold to the first stage, the second stage, or the third stage distinguishably by an operation button provided separately. For example, when the threshold is divided into three stages and the first threshold is changed, the first to third stages may be preset thresholds such as 200 LUX, 300 LUX, and 400 LUX. In addition, when the second threshold is changed, the first to third stages may be preset thresholds such as 900 LUX, 800 LUX, and 700 LUX. However, aspects of the present disclosure are not limited thereto, and if a threshold is divided into more stages, the difference in numerical values of respective stages in each of the first threshold and the second threshold may be set more densely.

In addition, when the operation unit for changing the first threshold and the second threshold is performed by separate operation buttons, a button for setting the first threshold and a button for setting the second threshold may be driven by the separate operation buttons, respectively, or may be changed by an operation of one button. In addition, an operation button for adjusting stages of each threshold in a state in which setting for changing the first threshold or the second threshold is set may be provided separately. However, aspects of the present disclosure are not limited thereto. If necessary, the operation button may be implemented in a way that, for example, stages of the first threshold are changed when the operation button is pushed in a sliding manner while pressed once, and stages of the second threshold are changed when the operation button is pushed in a sliding manner while not pressed. Or, the operation button may be applied in various ways, for example, that the operation button is controlled in a touch manner on a separate display window.

Meanwhile, an ambient illuminance may be sensed and sampled by the illuminance sensor 20 and 21 at least three times or more, and the controller may detect the rate of change in sampled ambient illuminances. Accordingly, at least one of the first threshold and the second threshold may be changed based on the rate of change in the ambient illuminances. In addition, changing the first threshold and the second threshold by performing the sampling three times or more may be performed by setting the user to perform sampling manually. In addition, the sampling may be performed automatically or may be performed at an interval of a specific time set by the user.

For example, in a dark night or in a dark indoor space, the sampling may be performed three times or more at a specific interval, so the controller may determine that ambient illumination is generally dark and then may adjust the LCD panel in a way to increase the light transmittance generally. Thus, the first threshold may be set relatively high by applying a generous criterion to the first threshold. In this case, the second threshold may be set relatively high by applying a strict criterion.

However, in the case where a surrounding environment is found as temporarily dark, instead of a dark environment, by performing sampling three times or more, if a high illuminance is measured at two samplings and a low illuminance is measured at one sampling, the controller may determine that the illuminance is temporarily decreased due to an obstacle or the like and may expect that the surrounding environment is a high illuminance environment: in this case, the controller may set the first threshold relatively low by applying a strict criterion and may set the second threshold relatively low by applying a generous criterion.

On the contrary, in a bright day or in an indoor space where high brightness is maintained, the controller may determine that the ambient illumination is found as generally bright by performing sampling three times or more, and then the controller may adjust the light transmittance of the LCD panel generally. In this case, the second threshold may be set relatively low by applying a generous standard, and the first threshold may be set relatively low by applying a strict standard. On the other hand, when the environment is found as temporarily bright through samplings and the surrounding situation is determined as generally dark, the controller may set the second threshold relatively high by applying a strict criterion and may set the first threshold relatively high by applying a generous criterion.

In addition, as a non-limiting example, changing the first threshold and the second threshold through the three samplings may be performed continuously, may be set to be performed after a predetermined time period, and may be set to be performed only when the user operates. Alternatively, changing the first threshold and the second threshold through the three samplings may be performed when the user may set a sampling interval time or when a difference between a previous illuminance and a current illuminance rapidly changes by a certain value or more.

Figure 6:
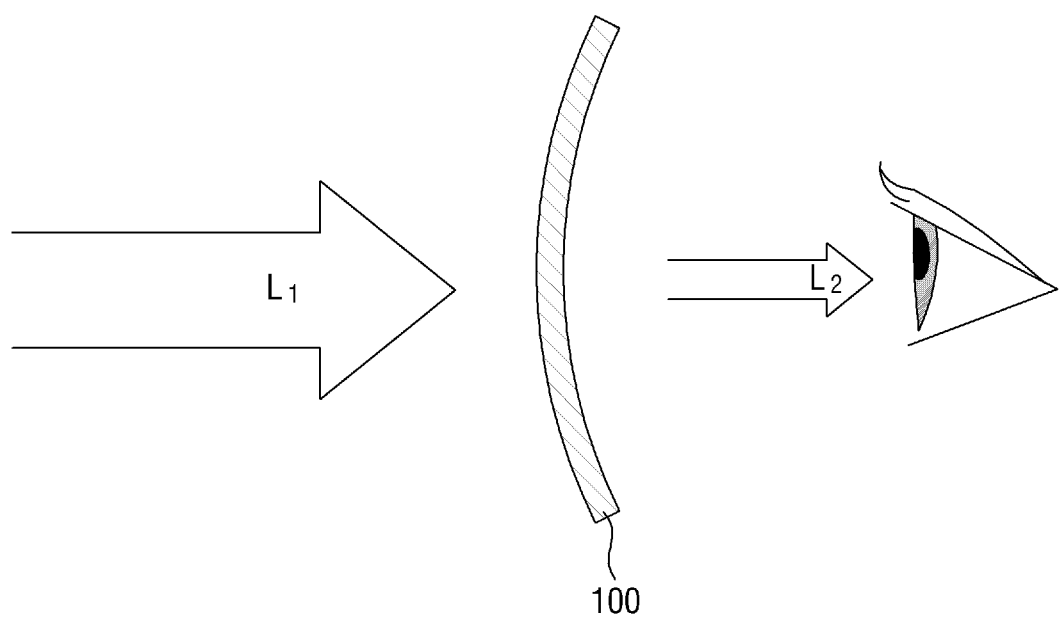
FIGS. 6 and 7 are schematic views illustrating the case where a lens unit of a light transmittance adjustable eyewear according to an exemplary embodiment of the present disclosure adjusts a light transmittance in response to a high quantity of light and in response to a low quantity of light.
Figure 7:
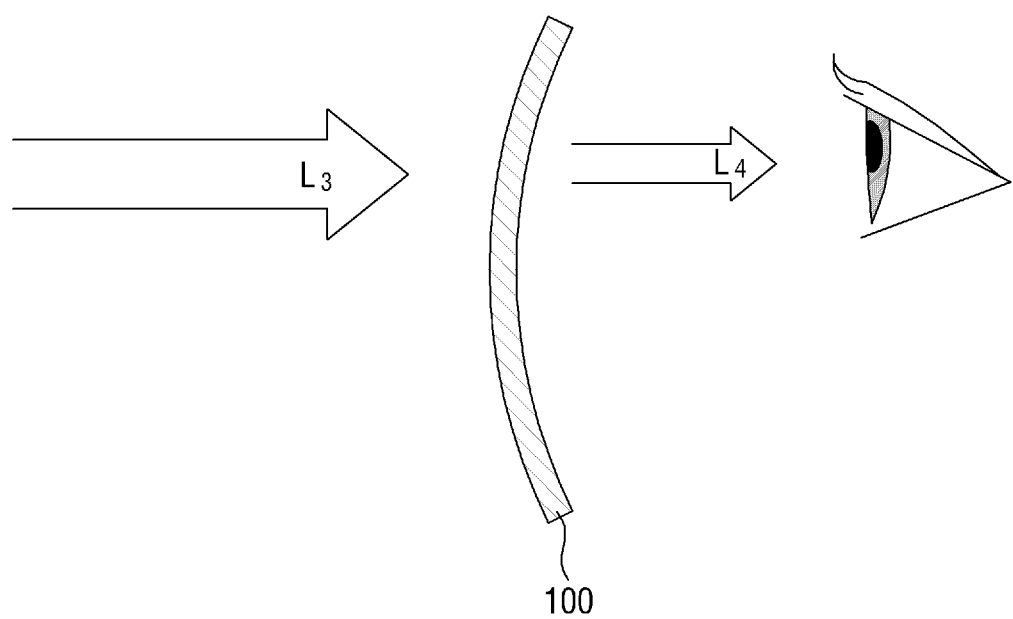

FIGS. 6 and 7 are diagrams schematically illustrating the case where a lens unit of a light transmittance adjustable eyewear according to an embodiment of the present disclosure adjust a light transmittance when there is a high quantity of light (when ambient illumination is relatively bright) and when there is a relatively low quantity of light (when ambient illumination is relatively dark). FIG. 6 shows the case where the quantity of light is high, and FIG. 7 shows the case where the quantity of light is low. Hereinafter, the light transmittance adjustable eyewear of the present disclosure will be described in more detail with reference to FIGS. 6 and 7.

Referring to FIGS. 6 and 7, in describing adjustment of the quantity of light in detail, the light transmittance adjustable eyewear according to the present disclosure sets a second threshold for a relatively high quantity of light, as shown in FIG. 6, for example, in the case where light L1 of a high illuminance is introduced into the LCD panel from the outside, and may set a first threshold for a low quantity of light, for example, in the case where light L3 of a low illuminance is introduced into the LCD panel from the outside, and therefore, it is possible to adjust a light transmittance so that a user visually easily recognizes an external object and glare can be prevented. That is, when the light L1 of the high illuminance is introduced into the LCD panel from the outside as shown in FIG. 6, the light transmittance may be adjusted on the basis of the second threshold so that the light transmittance is decreased and therefore only the light L1 in a low quantity is transmitted to the user's eye. In addition, when the light L3 of the low illuminance is introduced into the LCD panel from the outside as shown in FIG. 7, the light transmittance may be increased due to the first threshold, so that light L4 in a quantity relatively greater than the quantity of light in the example of FIG. 6 is transmitted to the eye of the user. Thus, in the example of FIG. 6 regarding the high ambient illuminance and the example of FIG. 7 regarding the low ambient illuminance, a similar quantity of light may be transmitted to the eye of the user, thereby maximizing the visibility of the user. In addition, even if a similar quantity of light is not transmitted to the eye of the user in the example of FIG. 6 and the example of FIG. 7 according to a degree of ambient illumination around the user, it is possible not to cause the user uncomfortable in visually recognizing an external object by reducing a difference in the quantity of light between the example of FIG. 6 and the example of FIG. 7.

In other words, the user may not react sensitively to a certain change of illuminance in a quantity of light between the first threshold and the second threshold and may not feel uncomfortable in visually recognizing an object: however, when an ambient illuminance is less than the first threshold or greater than the second threshold, the user may feel very uncomfortable. Therefore, the light transmittance adjustable eyewear of the present disclosure may adjust the light transmittance in the LCD panel through the controller with respect to an ambient illuminance of a sensitive area where the user could feel uncomfortable, thereby maximizing the convenience and visibility of the user. In addition, due to a sudden change in the light transmittance of the LCD panel, it is possible to use the eyewear continuously in both dark and bright environment without taking off the eyewear, maximizing convenience. In addition, as in the light transmittance adjustable eyewear of the present disclosure, the second threshold corresponding to the high ambient illuminance value is set and the first threshold corresponding to the low ambient illuminance value is set, so it is possible to prevent a sudden change in a light transmittance with respect to change in ambient illumination, which does not cause the user to feel uncomfortable with a surrounding object, thereby maximizing convenience and preventing fatigue to the user.

Meanwhile, when a previous ambient illuminance exceeding the first threshold is changed to a current ambient illuminance being equal to or less than the first threshold, the controller may increase the light transmittance of the LCD panel. In addition, even when a previous ambient illuminance being equal to or less than the first threshold is changed to a current ambient illuminance exceeding the first threshold, the light transmittance of the LCD panel may be maintained at the previous light transmittance.

Similarly, when a previous ambient illuminance being less than the second threshold is changed to a current ambient illuminance being equal to or greater than the second threshold, the controller may decrease the light transmittance of the LCD panel. Even when a previous ambient illuminance equal to or greater than the second threshold is changed to a current ambient illuminance less than the second threshold, The light transmittance of the LCD panel may maintain the previous light transmittance.

That is, the controller may detect a previous ambient illuminance and a current ambient illuminance received from the illuminance sensor 20 and 21, and only when a change from the previous ambient illuminance to the current ambient illuminance is from above the first threshold to or below the first threshold or from below the second threshold to or above the second threshold, the controller may increase the light transmittance (in the case of the first threshold) or decrease the light transmittance (in the case of the second threshold). Therefore, in the case where the light transmittance is increased as an ambient illuminance is changed to the first threshold or below, and in the case where the ambient illuminance is not increased to or above the second threshold, the current light transmittance may be maintained. In the case where the light transmittance is decreased as an ambient illuminance is changed to or above the second threshold, and when an ambient illuminance is not decreased to or below the first threshold, a current light transmittance may be maintained. In doing so, light transmittance adjustment may be performed more stably even in response to a minute change in a surrounding environment or a temporary change in the ambient illuminance according to a specific situation.

As described above, if the controller increases the light transmittance of the LCD panel only when a previous ambient illuminance greater than the first threshold is changed to a current ambient illuminance equal to or less than the first threshold and if the controller decreases the light transmittance of the LCD panel only when a previous ambient illuminance less than the second threshold is changed to a current ambient illuminance equal to or greater than the second threshold, it is possible to prevent a sudden change in the light transmittance of the LCD panel due to a minute change in the ambient illuminance in the vicinity of the first threshold and the second threshold. As a result, the light transmittance of the LCD panel may be adjusted only in response to a sudden change in the user's ambient illuminance, thereby providing stability to the user and reducing unnecessary consumption of power.

For example, the case where a previous ambient illuminance greater than the first threshold is changed to a current ambient illuminance equal to or less than the first threshold may correspond to, for example, entering a tunnel such that bright ambient illumination becomes rapidly dark. In this case, the light transmittance may be increased to improve visibility of a surrounding object. A light such as a lamp inside a tunnel may be visually recognized and decreased in the light transmittance by the controller, and accordingly, If the light transmittance is rapidly decreased, the user may have difficulty driving because an external object is not recognized visually. As in the present disclosure, if the light transmittance is increased by the controller only when a previous ambient illuminance greater a first threshold to a current ambient illuminance equal to or less than the first threshold, and otherwise if the current light transmittance is maintained when a change in the ambient illuminance is not less than a second threshold, it is possible to prevent the eyewear from malfunctioning with respect to a temporary change in illuminance in the vicinity of the first threshold.

On the contrary, the case a previous ambient illuminance less than a second threshold is changed to a current ambient illuminance equal to or greater than the second threshold may correspond to, for example, exiting out a tunnel such that dark ambient illumination becomes bright rapidly. In this case, the light transmittance may be decreased to prevent glare and to increase visibility of a surrounding object. Even after passing through the tunnel, an ambient illuminance may be temporarily decreased by shadow of nearby buildings. Even in this case, if the light transmittance is increased, the user of the eyewear may temporarily feel glare. Therefore, as in the present disclosure, unless an ambient illuminance is changed up to the first threshold to make the surroundings dark, the light transmittance is controlled not to be changed, and thus, the light transmittance is not changed even when an ambient illuminance is slightly decreased, thereby enabling light transmittance adjustment of the eyewear to be performed stably.

As described above, when a previous ambient light and a current ambient light are greater than the first threshold and less than the second threshold, that is, when a change between the previous and current ambient illuminances is not out of the range of the first threshold to the second threshold, the light transmittance may not be changed and Instead maintained at the previous state, thereby giving the user a visual stability. For example, in the case where the first threshold and the second threshold are set to specific values, only when a rapid change in ambient illumination occurs, the light transmittance may be changed to cross the boundary between the first threshold and the second threshold, and the light transmittance may not be changed in response to a minute change in ambient lumination within the range of the first threshold to the second threshold.

In other words, the change in illuminance within the range of the first threshold to the second threshold may be caused by shadow simply when the user passes through a specific location, or the ambient illuminance may be slightly changed due to cloud temporarily covering the sun. However, since the light transmittance of the LCD panel is not changed in response to such a small change in ambient illumination, the user may be allowed to visually recognize a change in the surrounding environment well. However, aspects of the present disclosure are not limited thereto, and the light transmittance may be slightly adjusted in consideration of the user's convenience even when the ambient illuminance is changed within the range of the first threshold to the second threshold range.

Meanwhile, when a previous ambient illuminance and a current ambient illuminance are greater than the first threshold or less than the second threshold, the controller may adjust the light transmittance of the LCD panel after determining a change between the previous ambient illuminance and the current ambient illuminance. That is, the controller may receive a previous ambient illuminance and a current ambient illuminance and may determine that the previous ambient illuminance and the current ambient illuminance are greater than to first threshold or less than the second threshold, and if the previous ambient illuminance to the current ambient illuminance are not out of the range of the first threshold to the second threshold, the controller may determine a difference between the previous ambient light and the current ambient light. In response to the determined difference in ambient illuminance, a specific correction value may be input to the current light transmittance to adjust the light transmittance.

In addition, as described above, when an ambient illuminance is greater than the first threshold and equal to or less than the second threshold, the light transmittance of the LCD panel may fall into a range from a light transmittance equal to or less than the first threshold and a light transmittance equal to or greater than the second threshold, and, as a non-limiting example, the light transmittance of the LCD panel may be adjusted within a light transmittance range of 1% to 90%. However, the light transmittance range may be changed in consideration of various factors such as a surrounding environment of the user and a purpose of use.

That is, when a previous ambient illuminance is changed to a current ambient illuminance equal to or less than the first threshold or to a current ambient illuminance equal to or greater than the second threshold, the light transmittance may be controlled to be rapidly changed to a predetermined light transmittance. In the range above the first threshold and below the second threshold, the rate of change from the previous illuminance to the current ambient illuminance, so that the light transmittance may be changed in phases by a value that is determined according to the rate of change within a range from a light transmittance at the first threshold and a light transmittance at the second transmittance and a specific correction value. That is, the light transmittance of the LCD panel may be minutely changed to a light transmittance determined by the specific correction value corresponding to the rate of change in ambient illuminances.

Therefore, as described above by taking an example of the tunnel, except for the case where ambient illumination is very bright or become bright rapidly and the case where ambient illumination is very dark or becomes dark rapidly, the light transmittance may be minutely adjusted in an illumination range that does not interfere with the safety of the user, thereby improving convenience while allowing the user to feel comfortable. That is, by adjusting the light transmittance to correspond to a minute change in ambient illumination to an extent where the user's visibility is not affected, it is possible to allow the user to feel comfortable.

When a previous ambient illuminance and a current ambient illuminance are greater than the first threshold or less than the second threshold, the controller may adjust the light transmittance of the LCD panel so that an illuminance of light having passed through the LCD panel becomes a specific illuminance value. The illuminance in the above range is an illuminance range in which the user does not feel uncomfortable in visually recognizing a surrounding object and instead the user may feel stable and comfortable. By setting an illuminance of light to be transmitted to the eye of the user according to the first illuminance which is an illuminance within the target range, it is possible to allow the user to always visually recognize at a substantially identical illuminance despite a change in illuminance in the surroundings even at a time when the user is wearing the eyewear.

To this end, as a non-limiting example, the controller may adjust the light transmittance by inputting a correction value to an amount of change in illumination from a previous ambient illuminance to a current ambient illuminance, so that an illuminance of light having passed through the LCD panel becomes the first illuminance. For example, in the case the illuminance of the light having passed through the LCD panel is set to 300 LUX, if an ambient illuminance is changed from 500 LUX to 400 LUX, light with an illuminance of 60% to 75% may be delivered to the eye of the user. In this case, the first illuminance may be understood to be 300 LUX. At this point, the rate of change in the light transmittance may be changed by a value of +12.5% with respect to the change in the ambient illuminance of −100 LUX, and the correction value may be input to the controller at 12.5%+/−100 LUX, thereby changing the light transmittance of the LCD panel.

Meanwhile, the light transmittance adjustable eyewear may sense and sample an ambient illuminance from the illuminance sensor at least three times or more, and transmit a control signal to the LCD panel based on an average value of ambient illuminances sensed and sampled at least three times or more by the controller. By adjusting the light transmittance based on the average value of the ambient luminances sampled at least three times or more, it is possible to precisely adjust the light transmittance.

In addition, as a preferred example, an ambient illuminance may be sensed and sampled at least three times or more from the illuminance sensor, and the controller may removes an ambient illuminance having the largest difference from other ambient illuminances in ambient illuminances sensed and sampled at least three times or more. This may mean that the ambient illuminance, which is too different from other illuminances sensed and sampled three times or more, is likely to be an incorrectly measured sample or that a certain high-intensity illuminance not affecting the user as compared with a normal illuminance of the surroundings may be incident, and accordingly the light transmittance may be malfunctioned. Therefore, by removing a sample having the greatest difference after sampling an ambient illuminance three times or more, it is possible to prevent the controller from incorrectly recognizing a situation of the ambient illuminance or to prevent malfunction of the light transmittance of the LCD panel.

The sampling, which is a non-limiting example, may be measured with a time interval of 10 ms. As such, by performing sampling at such a short time interval, it is possible to measure a quick and accurate ambient illuminance. However, the sampling time interval may be changed by various factors such as an environment for use and a purpose of use.

Meanwhile, the light transmittance adjustable eyewear according to the present disclosure may further include, as a non-limiting example, a UV sensor 400 and 410. The UV sensor 400 and 410 may be positioned at the front of the eyeglass frame 200 or the front of the lens frame 210 so as to be located on an optical path directly to the eye of the user, as shown in FIGS. 1 and 4, so that a UV index can be sensed more precisely. However, aspects of the present disclosure are not limited thereto, and the UV sensor 400 and 410 may be positioned on the eyeglass frame 200, a lens rim supporting the lens unit, or a side surface such as the temple 300 or the lens frame 210. When a UV index of the surrounding environment becomes equal to or greater than a certain value, the UV sensor 400 and 410 may sense the situation and give a warning alarm to the user through the controller. The warning alarm may be a separately implemented by an LED lamp or a vibration method, but not particularly limited thereto.

The light transmittance adjustable eyewear may further include an indicator (not shown). The indicator may be an LED, for example. The indicator may display an operation method of the light transmittance adjustable eyewear, display an UV index in case of including a UV sensor, display on/off of a power supply, or display a combination thereof. For example, when the indicator displays the operation method, the user may easily recognize whether the indicator is an on mode, a manual mode, or an off mode according to a displayed color. In addition, when a UV index of an external environment around the user, sensed by the UV sensor 400 and 410, is stable, the indicator may be displayed in green, and when the UV index of the external environment around the user is a dangerous value, the indicator may be displayed in red, so that the user is informed of the UV index. In addition, in the on mode to operate the LCD, the indicator may be turned off, and, in the off mode, the indicator may be turned off. However, aspects of the present disclosure are not limited thereto, and the indicator may be configured as a general display device and may be implemented in a manner in which each mode, a change in light transmittance, and an on/off state is displayed on a display window.

Meanwhile, the light transmittance adjustable eyewear may include a transmission and reception hub to transmit and receive information to and from a user's smart device. As a result, information on an illuminance around the user may be transmitted to the smart device of the user and displayed on the smart device, or a UV index around the user may be transmitted to the smart device of the user and displayed on the smart device. In addition, the user may be allowed to confirm a general state of the light transmittance adjustable eyewear directly through the user's smart device, such as light transmittance information of the LCD panel, light transmittance change information, a user pattern, a remaining battery capacity, and the like.

Meanwhile, as a non-limiting example, the light transmittance adjustable eyewear of the present disclosure may include, if necessary, an anti-glare layer, an anti-fog layer, an anti-scratch layer, and the like on an outer side or the light transmittance adjustable eyewear may further include a eyeglass nose pad (not shown), a wearing detection device (not shown) disposed at a portion to be in contact with the face of the user to detect whether or not the eyewear is worn.<an inner side of the lens unit 100 and 110 including the LCD panel. The light transmittance adjustable eyewear may further include a eyeglass nose pad (not shown), a wearing detection device (not shown) disposed at a portion to be in contact with the face of the user to detect whether or not the eyewear is worn.

While the present disclosure has been described with reference to exemplary embodiments thereof, it will be understood by those of ordinary skill in the art that various changes in form and detail may be made therein without departing from the spirit and scope of the present disclosure. Therefore, the above-described embodiments should be considered in a descriptive sense only, and not for purposes of limitation.

What is claimed is:

1. A light transmittance adjustable eyewear, comprising:
a lens unit including a Liquid Crystal Display (LCD) panel of which a light transmittance is changed;
an illuminance sensor configured to sense an ambient illuminance; and
a controller configured to receive an ambient illuminance from the illuminance sensor, increase a light transmittance of the LCD panel in response to the ambient illuminance being equal to or less than a first threshold, and decrease the light transmittance of the LCD panel in response to the ambient illuminance being equal to or greater than the second threshold that is greater than the first threshold,
wherein, when a previous ambient illuminance exceeds the first threshold and a current ambient illuminance is changed to be equal to or less than the first threshold, the controller increases the light transmittance of the LCD panel,
wherein, when a previous ambient illuminance is less than the second threshold and a current ambient illuminance is changed to be equal to or greater than the second threshold, the controller increases the light transmittance of the LCD panel,
wherein after the light transmittance is increased in response to an ambient illuminance being changed to the first threshold or below, the controller maintains the increased light transmittance as long as the ambient illuminance is not increased to or above the second threshold,
wherein after the light transmittance is decreased in response to an ambient illuminance being changed to or above the second threshold, the controller maintains the decreased light transmittance as long as the ambient illuminance is not decreased to or below the first threshold, and
wherein the ambient light sensor senses and samples an ambient illuminance at least three times or more, and the controller removes an ambient illuminance having a greatest difference from other ambient ambiences in ambient illuminances sampled three times or more.

2. The light transmittance adjustable eyewear of claim 1, wherein the LCD panel has a light transmission range of 1% to 90%.

3. The light transmittance adjustable eyewear of claim 1, further comprising a power supply configured to supply power to the LCD panel,
wherein, when an ambient illuminance is equal to or less than the first threshold, the power supply increases the light transmittance of the LCD panel by supplying power to the LCD panel according to a control signal transmitted from the controller, and
wherein, when an ambient illuminance is equal to or greater than the second threshold, the light transmittance of the LCD panel decreases the light transmittance of the LCD panel by cutting off power to the LCD panel according to a control signal transmitted from the controller.

4. The light transmittance adjustable eyewear of claim 3, wherein the LCD panel has a light transmittance of a first value in a state where no power is applied, and the LCD panel has a light transmittance of a second value greater than the first value in a state where power is applied.

5. The light transmittance adjustable eyewear of claim 3, further comprising a photo interrupter configured to control the power supply to be manually turned on/off.

6. The light transmittance adjustable eyewear of claim 1, further comprising a power supply configured to supply power to the LCD panel,
wherein, when the power supply supplies power to the LCD panel, the LCD panel is controlled to have a light transmittance of a first value, and when the power is cut off to the LCD panel, the LCD panel is controlled to have a second light transmittance greater than the first value.

7. The light transmittance adjustable eyewear of claim 6, further comprising a photo interrupter configured to control supplying of power to the LCD panel to be manually turned on/off.

8. The light transmittance adjustable eyewear of claim 7, further comprising a mode switch configured to switch to an off mode, an on mode, and a manual mode,
wherein the light transmittance of the LCD panel is fixed in the off mode, the light transmittance of the LCD panel is adjusted by the controller in the on mode, and the light transmittance of the LCD panel is adjusted by the photo interrupter in the manual mode.

9. The light transmittance adjustable eyewear of claim 1, wherein, when a previous ambient illuminance and a current ambient illuminance are greater than the first threshold or less than the second threshold, the controller adjusts the light transmittance of the LCD panel so that an illuminance of light having passed through the LCD panel becomes a first illuminance.

10. The light transmittance adjustable eyewear of claim 9, wherein the controller adjusts the light transmittance by inputting a correction value to an amount of change in illumination from a previous ambient illuminance to a current ambient illuminance, so that an illuminance of light having passed through the LCD panel becomes the first illuminance.

11. The light transmittance adjustable eyewear of claim 1, wherein at least one of the first threshold and the second threshold is changeable.

12. The light transmittance adjustable eyewear of claim 11, wherein at least one of the first threshold and the second threshold is manually changeable.

13. The light transmittance adjustable eyewear of claim 11, wherein the ambient light sensor senses and samples an ambient illuminance at least three times or more, and the controller senses a rate of change of sampled ambient illuminances, and
wherein at least one of the first threshold and the second threshold is changed based on the rate of change in the ambient illuminances.

14. The light transmittance adjustment eyewear of claim 1, wherein the ambient light sensor senses and samples an ambient illuminance at least three times or more, and the controller transmits a control signal to the LCD panel based on an average value of ambient illuminances sampled three times or more.

15. A light transmittance adjustable eyewear, comprising:
a lens unit including a Liquid Crystal Display (LCD) panel of which a light transmittance is changed;
an illuminance sensor configured to sense an ambient illuminance;

a mode switch configured to switch to an off mode, an on mode, and a manual mode;
a controller configured to adjust a light transmittance of the LCD panel; and
a photo interrupter configured to manually change the light transmittance of the LCD panel,
wherein, when the mode switch is in the off mode, the light transmittance of the LCD panel is fixed,
wherein, when the mode switch is in the on mode, the controller receives an ambient illuminance from the illuminance sensor, and the controller increases the light transmittance of the LCD panel in response to the ambient illuminance being equal to or less than a first threshold and decreases the light transmittance of the LCD panel in response to the ambient illuminance being equal to or greater than a second threshold that is greater than the first threshold,
wherein, when the mode switch is in the manual mode, in response to a user touching the photo interrupter once, the controller controls the light transmittance of the LCD panel to have a light transmittance of a first value, and, in response to the user touching the photo interrupter once again, the controller controls the light transmittance of the LCD panel to have a light transmittance of a second value different from the first value,
wherein, when a previous ambient illuminance exceeds the first threshold and a current ambient illuminance is changed to be equal to or less than the first threshold, the controller increases the light transmittance of the LCD panel,
wherein, when a previous ambient illuminance is less than the second threshold and a current ambient illuminance is changed to be equal to or greater than the second threshold, the controller increases the light transmittance of the LCD panel,
wherein after the light transmittance is increased in response to an ambient illuminance being changed to the first threshold or below, the controller maintains the increased light transmittance as long as the ambient illuminance is not increased to or above the second threshold,
wherein after the light transmittance is decreased in response to an ambient illuminance being changed to or above the second threshold, the controller maintains the decreased light transmittance as long as the ambient illuminance is not decreased to or below the first threshold, and
wherein the ambient light sensor senses and samples an ambient illuminance at least three times or more, and the controller removes an ambient illuminance having a greatest difference from other ambient ambiences in ambient illuminances sampled three times or more.

* * * * *